Aug. 6, 1968  T. TROCKI ET AL  3,395,781
VELOCITY LIMITER

Filed Oct. 23, 1965  2 Sheets-Sheet 1

INVENTORS.
THOMAS TROCKI
EUGENE E. OLICH

Aug. 6, 1968
T. TROCKI ET AL
3,395,781
VELOCITY LIMITER
Filed Oct. 23, 1965
2 Sheets-Sheet 2
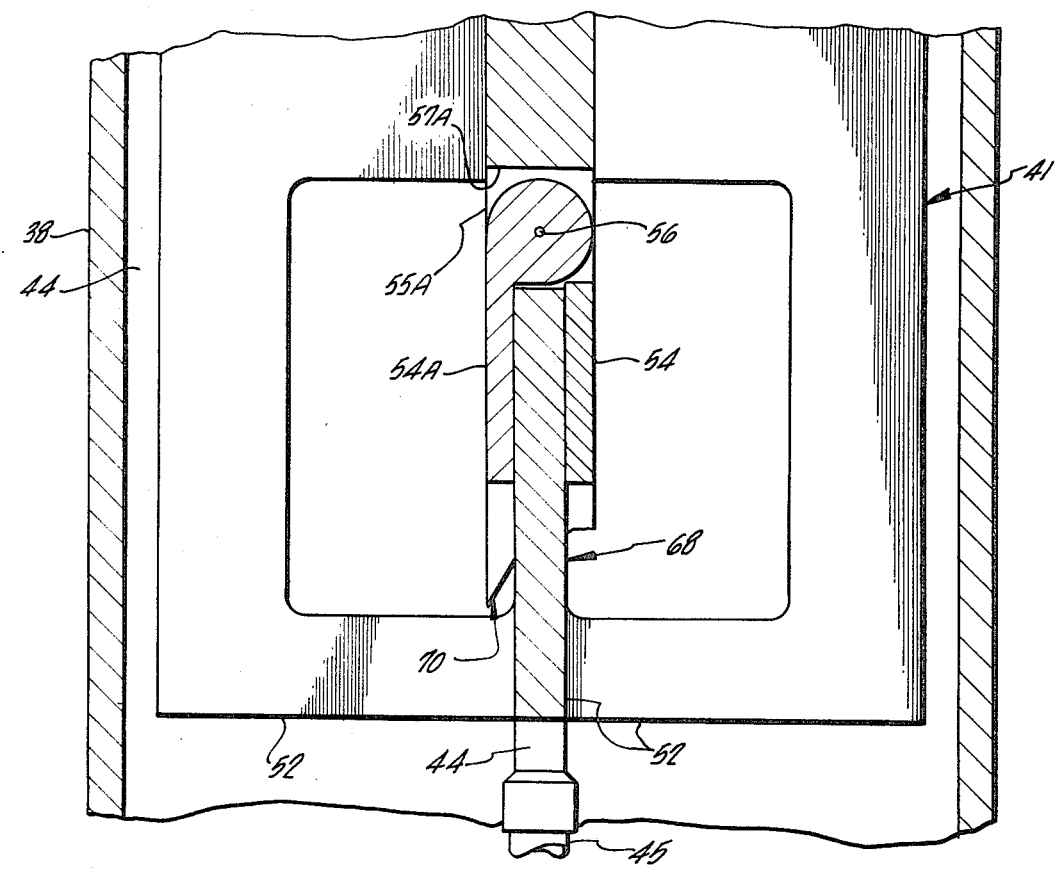
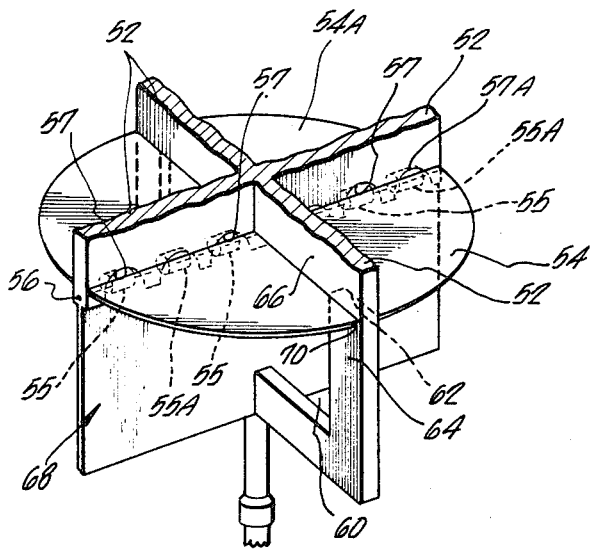
INVENTOR.
THOMAS TROCKI
EUGENE E. OLICH

United States Patent Office 3,395,781
Patented Aug. 6, 1968

3,395,781
VELOCITY LIMITER
Thomas Trocki, and Eugene E. Olich, San Jose, Calif., assignors to General Electric Company, New York, N.Y., a corporation of New York
Filed Oct. 23, 1965, Ser. No. 504,048
3 Claims. (Cl. 188—96)

ABSTRACT OF THE DISCLOSURE

This describes a velocity-limiting device wherein a control member is reciprocable in a fluid-filled hollow member, the control member including flaps which are pivotable from a position parallel to the direction of travel of the control body when the control member moves in one direction to a position transverse of the direction of travel of the control body when the control member moves in the other direction whereby the resistance to motion of the control member is less in the one direction than in the other.

---

This invention relates to fluid-actuated, velocity-limiting devices. More particularly, it relates to such devices in which a first body slides inside a second hollow body which contains a fluid that is displaced through a gap between the bodies when they move relative to each other.

Such devices as described herein are useful in many instances where controlled movement of an object is required. For example, the devices are used in shock absorbers, machine tools, jacks, and hoists. The devices are also used in the remote positioning and control of movement of objects within an enclosure under nonatmospheric conditions of temperature and pressure. One such use of the devices is in the positioning and control of movement of a nuclear reactor poison or control element in a chain-reacting assembly or core of a nuclear reactor to vary neutron flux and power levels. To illustrate the present invention, the device is described as used in a nuclear reactor, although it can be used in other applications.

U.S. Patent No. 3,020,888 describes a nuclear reactor with means for regulating the movement of the control element to vary the power output of the reactor. In a nuclear reactor, fissionable atoms such as $U^{233}$, $U^{235}$, $Pu^{239}$, and $Pu^{241}$ absorb neutrons in their nuclei and undergo a nuclear disintegration. This produces on the average of two fission products of lower atomic weight and greater kinetic energy, and usually two or three neutrons, also of high energy.

Fission neutrons thus produced diffuse through the nuclear chain-reacting assembly and are either used or lost in several distinct competing mechanisms. Some neutrons migrate to the boundary of the chain-reacting assembly and escape or are lost from the system. Other neutrons undergo nonfission or radiative capture in the nuclear fuel. Still other neutrons undergo fission capture in the fuel producing additional fission neutrons. For example, fast neutrons are thus captured in $U^{235}$ or $U^{238}$ and thermal neutrons are thus captured in $U^{235}$. Still other neutrons undergo parasitic capture in the various extraneous or nonfissionable portions of the chain-reacting assembly, such as in the moderator, coolant, various structural materials necessarily present, fission products in the fuel, as well as in the nuclear reaction control elements.

The neutron balance between the production of fission neutrons and these various competing mechanisms for neutron utilization determine whether or not over any given time interval the fission reaction is self-sustaining, decreasing, or increasing. When the reaction is self-sustaining, the neutron multiplication factor ($k_{eff}$) equals 1.00, the neutron population remains constant, and on the average, there is one neutron remaining from each fission event which induces a subsequent fission. Heat generation is thus continuous and it may be maintained so long as sufficient fissionable material is present in the system to override the effects of fission products, some of which are very strong nuclear reaction poisons, which are produced during operation. The heat generated in the system may be removed by passing a coolant through heat exchange relationship with the nuclear fuel in the chain-reacting assembly and such heat may be used as such or to produce mechanical or electrical power.

The neutron population and the power output of the nuclear reactor depend on the extent to which neutrons are consumed or wasted in nonfission capture. This type of consumption is regulated by changing the relative amount of control element material in the chain-reacting assembly or core. Control elements are usually in the form of rods, sheets, or blades which are mounted to be moved into and out of the chain-reacting assembly. A suitable drive mechanism is customarily connected to the control elements so their positions can be set in the nuclear reactor and thus control its power output. The control elements contain materials with atoms that have high nonfission neutron capture cross sections, i.e., atoms which readily absorb and hold neutrons without undergoing nuclear disintegration to produce additional neutrons. Some of the common control materials are boron, cadmium, silver, and mercury in elemental, alloy, or compound form.

In a typical nuclear reactor, the drive means for moving and holding the control rods in the desired position must usually pass through a fluid-tight seal and yet be free to move through the vessel wall. Such seals are invariably subject to wear, particularly under the conditions of high temperature and pressure prevailing in nuclear reactors. The high intensity of radio activity also tends to weaken and accelerate deterioration of materials.

Failure of a control element driving mechanism could result in a runaway operation of a nuclear reactor. For example, the high pressure inside the reactor tends to drive the control elements out of the chain-reacting assembly. If this were permitted, the neutron flux would immediately rise to a high level. Accordingly, safety requires that the movement of the control elements out of the nuclear reactor be at a controlled and retarded rate. On the other hand, a sudden change in the amount of power taken from the reactor can result in a build up of neutron flux which requires immediate and rapid insertion of the control elements to effect "scram," or a rapid shutdown of the reactor. Consequently, the control elements must be relatively free to move rapidly into the chain-reacting assembly and yet restrained from being driven out at a high rate.

In the boiling water reactor, certain advantages are realized in control of reactor power distribution by inserting the control element from the bottom upwards into the core. However, this leaves the control element subject to falling out of the core under the force of gravity if it is accidentally separated from its driving mechanism. Under certain conditions of reactor operation, the uncontrolled fallout of a control element can lead to undesirable excursion of reactor power and possible reactor damage. This invention provides a control mechanism for limiting the fallout velocity of the control element to a sufficiently low value which precludes a damaging excursion.

The control mechanism is easily moved in one direction, and yet offers high resistance to movement in the opposite direction. The device of this invention is easily connected to a control element in a nuclear reactor so the control element can be moved freely into the reactor and yet offers high resistance to movement out of the reactor in case of failure of the drive mechanism for regulating the position of the control element. This gives time to move other control rods into the reactor core to compensate for the loss of the one forced out.

Briefly, the preferred embodiment of the velocity control mechanism of this invention includes a hollow body adapted to hold a fluid. A control body is mounted in the hollow body and spaced from it. Means are connected to the control body for reciprocating it in the hollow body to drive fluid back and forth through the space between the two bodies. A flap is secured to the control body to pivot about an axis extending transverse to the direction of travel of the control body to generate more resistance to fluid flowing through the space between the two bodies when the control body is moved in one direction than in the other.

In the preferred form of the invention, the flap, in a collapsed position, extends away from the pivot in the same general direction in which the control body moves when there is to be maximum resistance to its movement through the hollow body. When fluid moves past the flap in the opposite direction, the flap is lifted to an extended position to present maximum resistance to fluid flow past it. A stop limits the outward travel of the flap to a position where it presents maximum cross-sectional area to fluid trying to flow past it.

When the velocity control mechanism of this invention is used in a nuclear reactor, the control body preferably has the configuration of a cruciform in cross section and is arranged to fit between adjacent fuel cells in the reactor. In effect, the control body is made up of four mutually perpendicular and intersecting blades which preferably are integrally formed. The control body is mounted to reciprocate in a hollow cylinder which circumscribes the cruciform. A semicircular flap is secured to one side of a pair of oppositely-disposed blades in the cruciform and extends through an opening formed in the blade which is mutually perpendicular to the two oppositely-extending blades and on the same side of them as the flap. A similar semicircular flap is symmetrically arranged on the opposite side of the two oppositely-extending blades so that when the two flaps are swung outwardly away from the blade on which they are mounted, they form a piston or circular disk which substantially fills the hollow cylindrical body and thereby offers great resistance to fluid flow in the space between the control body and hollow cylindrical body. When the control body is moved in the opposite direction, fluid pressure forces the flaps into a collapsed position against the blade on which they are mounted, and the control body is free to move through the hollow cylinder with minimum resistance.

These and other aspects of the invention will be more fully understood from the following detailed description and the accompanying drawings, in which:

FIG. 3 is an enlarged view of a control body with the flaps in the collapsed position and taken in the area of line 3—3 of FIG. 1; and FIG. 4 is a perspective view of the control body shown in FIG. 3 with the flaps in the extended position.

Figure 1:
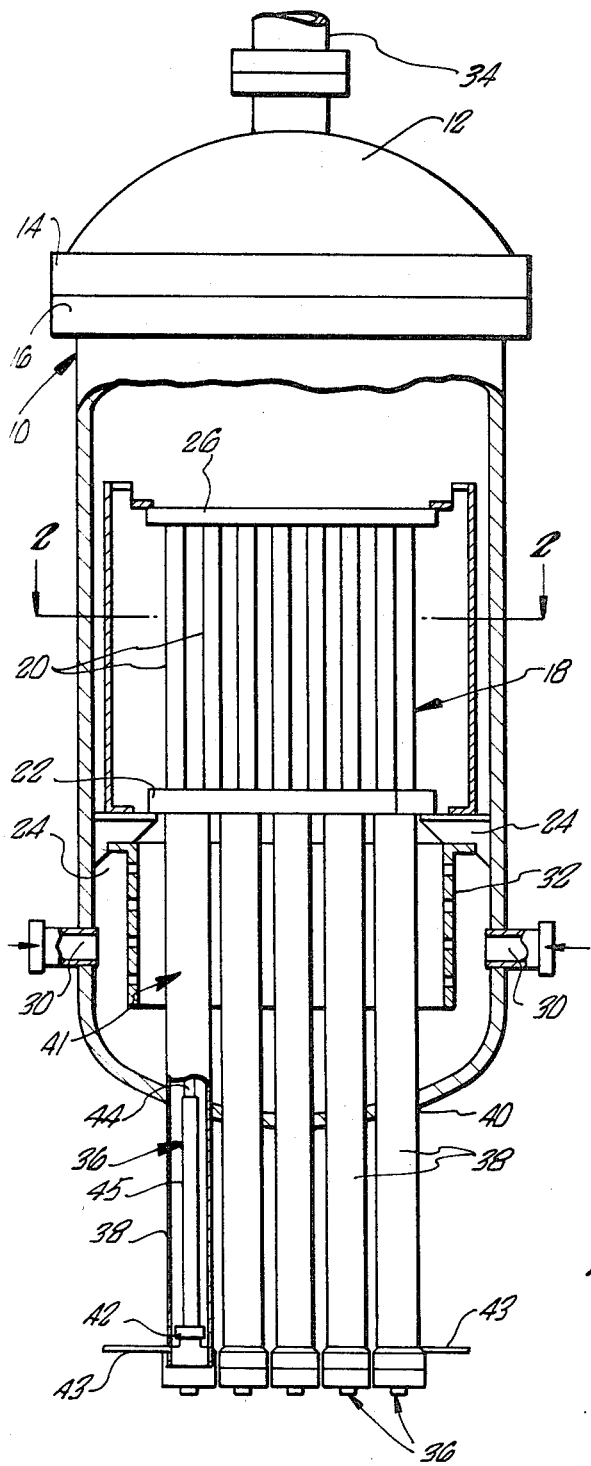
FIG. 1 is an elevational view, partly broken away and partly in cross section, showing the velocity limiter of this invention applied to the movement of control elements in a nuclear reactor.

Referring to FIG. 1, an upright cylindrical reactor pressure vessel 10 includes a removable head 12 secured to the top of the vessel by flanges 14 and 16. A nuclear chain-reacting assembly or core 18 made up of a plurality of vertically-disposed fuel cells 20 containing nuclear fuel (not shown) is supported within the vessel on a horizontal lower core support plate 22 which, in turn, is secured in the vessel by gussets 24. Each fuel cell has one or more conventional longitudinal flow channels 25 through it. A horizontal upper core grid 26 is secured to the upper ends of fuel cells 20 and maintains the relative spacing between them. An upright cylindrical thermal shield 28 surrounds the reactor core 18 and is spaced inwardly from the inner surface of the pressure vessel. The upper core grid guide 26 is supported from the upper end of the thermal shield, the lower end of which is secured to the gussets 24. The thermal shield attenuates gamma radiation emitted by the core and reduces heating of the pressure vessel wall.

The upper and lower ends of the channels in the fuel cells 20 are open to flow of a coolant, such as steam or water, through them. The coolant is introduced to the pressure vessel through inlet openings 30 under pressure from one or more pumps (not shown). The coolant flows through an upright perforated, cylindrical coolant diffuser 32 and then upwardly through flow channels 25. The diffuser is secured at its upper end to the gussets 24 just below core support plate 22. The heated coolant, which is partially vaporized in the case of a boiling reactor, for example, is removed from the pressure vessel through a coolant outlet 34 in the top of the dome-shaped head 12.

Control element drive mechanisms 36 are shown schematically in FIG. 1 and in more detail in U.S. Patent No. 3,020,888. Any suitable type of drive mechanism may be used, and, therefore, it is not shown in detail because it forms no part of the present invention. Each drive mechanism shown schematically in FIG. 1 is an integral unit disposed in a respective vertical cylinder or guide tube 38 secured by welds 40 through the bottom wall of the pressure vessel. The upper ends of the cylinders are secured to the core support plate which is of open network construction to pass vertical control elements 41 (FIGS. 1, 3, and 4) which enter the reactor core from the bottom. The control elements are withdrawn downwardly out of the core to start up and raise the power level of the reactor, and they are inserted upwardly into the reactor core to decrease the power level or shut the reactor down. The distribution of control elements in the reactor core and the cross section of a typical control element are described in more detail below.

Figure 2:
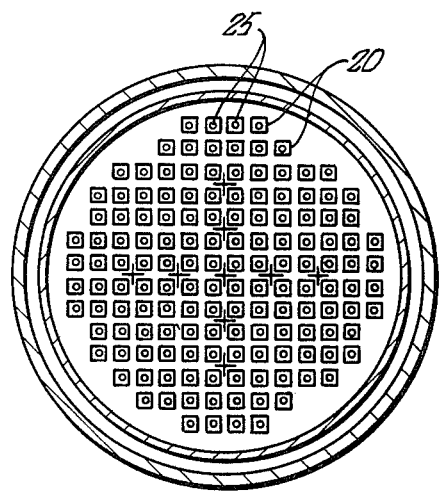
FIG. 2 is a view taken on line 2—2 of FIG. 1.

Referring to FIG. 2, the fuel cells 20 are square in cross section, although they can have other shapes such as circular, hexagonal, etc. In the modification shown in FIG. 2, fuel cells 20 are spaced slightly apart from each other in a lattice on a square pitch. Control elements 41, cruciform in cross section in their upper portions, which may conveniently be two percent boron stainless steel, are spaced throughout the lattice between adjacent flow cells. FIGS. 2 and 3 show the cruciform portion of one of the control elements 41. Each control element is movable into and out of the reactor core by a separate respective piston 42 in each cylinder 38. The control element is coaxially disposed in the cylinder so a uniform space or gap 43 is formed between them. The bottom of each control element 41 is connected by a coupling 44 to the upper end of a vertical piston rod 45 which extends down through the cylinder. The piston is moved up and down by a conventional mechanism that forms no part of the present invention and, therefore, is not described in detail. The vessel remains pressure tight even though the rod is moved up and down.

Each guide tube or cylinder 38 contains the coolant, say, water, used in the reactor. Each control element can move down and out of the reactor by its own weight or be pushed out by the pressure inside the vessel if the drive mechanism or connection between the control element and piston rod should fail. Ordinarily, the control elements are moved up and down as required by the pistons connected to the drive rods.

As shown best in FIG. 3, the upper cruciform portion of each control element is made up of four integral mutually perpendicular blades 52 which are attached at their lower ends to the upper end of the rod 45. If desired, the rod and blades can be formed integrally.

A first semicircular disk or flap 54 is secured by hinges 55 across one face of a pair of oppositely-extending blades. A hinge pin 56 extends through the blade and openings 57 through the blade which receive the hinges of the disk. An identical flap or disk 54A is secured to the opposite face of the oppositely-extending blades by hinges 55A which are secured in openings 57A by the same hinge pins which hold the first disk. Thus, the two semicircular disks hang downwardly from their respective hinges and normally lie flat in a collapsed position against the sides of the oppositely-extending blades. Each disk extends through a rectangular opening 60 in the blade which is perpendicular to the oppositely-extending blades and on the same side of the oppositely-extending blades as the respective disk. Each disk has a rectangular notch 62 in the center of its outer periphery to fit over a strap 64 which defines the outer limit of the opening 60 when the flaps are in the extended position. The central portion of each flap strikes a horizontal strap 66 forming the top of the opening 60 through the blade through which the flap extends. The horizontal strap acts as a stop to limit the outward travel of each disk to an extended position in which the flaps are perpendicular to the direction of travel of the control element.

The outwardly-extending blades are of reduced thickness in an area 68 to receive the flaps and permit them to lie flat against the blades when the flaps are in the collapsed position.

The lower or peripheral part of each flap remote from its hinged portion is tapered to a reduced thickness so that an edge 70 adjacent the blade when the flap is in its collapsed position extends outwardly away from the blade to act as a scoop to pick up fluid and force the flaps outwardly when the control body is moved downwardly.

In operation, when the control body is moved upwardly to insert the blades into the array of fuel cells, the flaps are in the collapsed position so that they rest against the blades and present minimum resistance to flow of fluid past them as the blades are moved into the fuel cell array.

When the blades are withdrawn or start to move downwardly out of the fuel cell array, fluid engages the lower periphery of each flap and forces it outwardly to the horizontal position shown in FIG. 6. Under this condition, the extended semicircular disks form a circular disk or piston which substantially fills the hollow cylinder and offers high resistance to downward movement of the control element.

We claim:
1. A velocity control mechanism comprising a hollow body adapted to hold a fluid, a control body mounted in the hollow body and spaced from it, said control body being reciprocable in the hollow body for driving fluid back and forth through the space between the bodies, the control body including four mutually perpendicular blades, one of the blades having an opening through it, and a flap disposed through the opening and secured to the control body to pivot about an axis extending transverse to the direction of travel of the control body to generate more resistance to fluid flowing through the space between the bodies when the control body is moved in one direction than in the other.

2. A velocity control mechanism comprising a hollow body adapted to hold a fluid, a control body mounted in the hollow body and spaced from it, said control body being reciprocable in the hollow body for driving fluid back and forth through the space between them, the control body including four mutually perpendicular blades, one of the blades having an enclosed opening through it, a strap closing the portion of the opening remote from the blades adjacent the one with the opening through it, and a flap disposed through the opening and secured to the control body to pivot about an axis extending transverse to the direction of travel of the body to generate more resistance to fluid flowing through the space between the bodies when the control body is moved in one direction than in the other, the flap having a notch in its edge remote from the pivot axis to fit over the strap.

3. A velocity control mechanism comprising a hollow cylindrical body adapted to hold a fluid, a control body mounted in the hollow body and spaced from it, said control body being reciprocable in the hollow body for driving fluid back and forth through the space between them, the control body including four mutually perpendicular blades, two of the blades extending in opposite directions and each of the two said blades having a separate respective enclosed opening through it, a separate strap closing the portion of each opening remote from the other blades, and a separate semicircular flap disposed through each opening and secured to opposite sides of the said other blades to pivot about an axis extending transverse to the direction of travel of the body to generate more resistance to fluid flowing through the space between the control body and hollow body when the control body is moved in one direction than in the other, each flap having a notch in its edge remote from the pivot axis to fit over the respective strap closing the opening through which the flap extends.

References Cited
UNITED STATES PATENTS

| | | | |
|---|---|---|---|
| 1,205,432 | 11/1916 | Christman | 188—88 |
| 1,273,677 | 7/1918 | Schwantes | 188—88 |

MILTON BUCHLER, *Primary Examiner.*

G. E. A. HALVOSA, *Assistant Examiner.*